United States Patent Office 2,705,240
Patented Mar. 29, 1955

2,705,240

STABILIZATION OF ORGANIC COMPOUNDS

Robert H. Rosenwald, Western Springs, Ill., assignor to Universal Oil Products Company, Chicago, Ill., a corporation of Delaware No Drawing. Application March 2, 1951,
Serial No. 213,680

8 Claims. (Cl. 260—398.5)

This invention relates to a method of stabilizing organic compounds which tend to deteriorate in storage or in use due to undesirable oxidation reactions.

Various organic compounds including motor fuel, particularly cracked gasoline, polymer gasoline, diesel oil, etc., mineral oil, lubricating oil, fuel oil, drying oil, greases, rubber, edible fats and oils, etc., are adversely affected by oxygen, with the resultant formation of undesirable gum, discoloration, rancidity, and other deleterious products.

One object of the present invention is to prevent or at least substantially retard this undesirable deterioration of organic compounds.

Another object of the present invention is to provide a novel method of preparation of an antioxidant resin which will function to stabilize organic compounds.

Another object of the invention is to provide a novel antioxidant resin which will function to stabilize organic compounds which tend to deteriorate in the presence of oxygen.

This invention is particularly applicable to the stabilization of organic materials in which the presence of a low vapor pressure antioxidant is advantageous. Typical representatives of such organic materials include drying oils used in the formulation of paints which later must be oxidized by air to form a protective coating, printing inks, adhesives, rubber, and hydrogenated edible fats and oils, as sold under various trade names including "Spry," "Crisco," "Snowdrift," etc. Similarly, this invention is applicable to the stabilization of mineral oils, motor fuels, and particularly motor fuels such as cracked gasoline and polymer gasoline, edible fats and oils which are generally of animal or vegetable origin such as linseed oil, menhaden oil, cod liver oil, castor oil, olive oil, rapeseed oil, coconut oil, palm oil, corn oil, sesame oil, peanut oil, babassu oil, butter, lard, beef tallow, etc.

In one embodiment the present invention relates to a method of stabilizing an organic material subject to oxidative deterioration which comprises adding thereto a resin comprising the oxidation product of a 2,5-dialkylphenol in which the alkyl group in the 2 position is secondary or tertiary.

In another embodiment the present invention relates to a method of preparation of an antioxidant resin which comprises the oxidation of a 2,5-dialkylphenol, in which the alkyl group in the two position is secondary or tertiary, in the presence of an oxidizing agent such as an alkali metal chlorate or ferricyanide, lead dioxide, silver oxide, hydrogen peroxide, etc.

In still another embodiment the present invention relates to an antioxidant resin prepared by the oxidation of a 2,5-dialkylphenol, in which the alkyl group in the two position is secondary or tertiary, in the presence of an oxidizing agent such as an alkali metal chlorate or ferricyanide, lead dioxide, silver oxide, hydrogen peroxide, etc.

In a specific embodiment the present invention relates to a method of stabilizing an organic material subject to oxidative deterioration which comprises adding thereto a resin, comprising the oxidation product of a 2,5-dialkylphenol in which the alkyl group in the two position is secondary or tertiary, prepared by the oxidation of said phenol in the presence of an oxidizing agent, such as an alkali metal chlorate or ferricyanide, lead dioxide, silver oxide, hydrogen peroxide, etc.

In a more specific embodiment the present invention relates to a method of stabilizing an organic material subject to oxidative deterioration which comprises adding thereto from about 0.001% to about 0.5% by weight of a resin, comprising the oxidation product as of a 2,5-dialkylphenol in which the alkyl group in the two position is secondary or tertiary, prepared by the oxidation of said phenol in the presence of an oxidizing agent such as an alkali metal chlorate or ferricyanide, lead dioxide, silver oxide, hydrogen peroxide, etc.

The antioxidant resins of the present invention are prepared by the oxidation of a 2,5-dialkylphenol in which the alkyl group in the two position is secondary or tertiary. Suitable 2,5-dialkylphenols include 2-isopropyl-5-methylphenol, 2-sec-butyl-5-methylphenol, 2-tert-butyl-5-methylphenol, 2-sec-amyl-5-methylphenol, 2-tert-amyl-5-methylphenol, etc., 2-isopropyl-5-ethylphenol, 2 - sec - butyl - 5 - ethylphenol, 2-tert-butyl-5-ethylphenol, etc., 2-isopropyl-5-n-propylphenol, etc., 2,5-di-isopropylphenol, etc.

The oxidation of the 2,5-dialkylphenol is readily effected in the presence of a suitable oxidizing agent. Such oxidizing agents include sodium chlorate, potassium chlorate, sodium ferricyanide, potassium ferricyanide, lead dioxide, silver oxide, hydrogen peroxide, etc.

Such oxidation is carried out, for example, by contacting the 2,5-dialkylphenol at a temperature of from about 0° C. to about 100° C. with sodium chlorate and an aqueous solution containing sulfuric acid or another mineral acid.

In another method of effecting such an oxidation, a pentane solution of a 2,5-dialkylphenol is contacted with an aqueous solution containing 10% by weight of sodium hydroxide, and this mixture is stirred while an aqueous solution of potassium ferricyanide is added thereto to form an antioxidant resin.

It is understood that an extensive number of resins may be prepared and used within the broad scope of the present invention but that, while all these compounds will have some potency in stabilizing organic materials, they are not necessarily of equivalent activity.

It is essential that the 2,5-dialkylphenol, from which these resins are prepared, must be substituted in the 2 position by an alkyl group which is secondary or tertiary. Further, it is generally preferred that the total number of carbon atoms in the phenol from which the resin is prepared is not greater than about 25, as it has been found that, within certain limits, the potency of the resins decrease with the inclusion of hydrocarbon radicals of high molecular weight.

The resins of the present invention are usually added to the organic materials in amounts of less than 1% by weight and generally are utilized in an amount from about 0.001% to about 0.5%. The exact amount will depend upon the particular organic compounds being treated and upon the potency of the specific inhibitor selected. The resin may be used alone or in conjunction with synergists, inhibitor activators, dyes, antiknock agents, etc., depending upon the material to be stabilized. For example, when used in edible fats and oils, a synergist, such as gallic acid, citric acid, phosphoric acid, or ascorbic acid, or esters of the before mentioned synergists will generally be used along with the resin. When used in gasoline, lead tetraethyl, ethylene dibromide, a dye, and perhaps an inhibitor activator, such as certain types of alkylene polyamines, may be used.

The following examples are introduced to illustrate further the novelty and utility of the present invention but not with the intention of unduly limiting the same.

The antioxidant resin of 2-tert-butyl-5-methylphenol was prepared as follows: 25 grams of 2-tert-butyl-5-methylphenol was added with stirring to a mixture of 100 ml. of n-pentane and 100 ml. of 10% by weight sodium hydroxide. The mixture was then cooled with an ice bath to 10° C. With continued stirring, 52 grams of potassium ferricyanide in 200 ml. of water were added to the mixture over a 10 minute period. The temperature of the reaction mixture rose to 15° C. during the addition of potassium ferricyanide solution. At the end of the 10 minute period the reaction mixture was allowed to separate into two layers, and the lower caustic layer was discarded. The pentane was evaporated from the upper layer on a steam bath and a reddish brown highly viscous oil remained. This oil was distilled under a 3 mm. vacuum, and one cut separated; boiling point 94° C./3 mm., weight 6.1 grams. This was identified as unreacted starting material, 2-tert-butyl-5-methylphenol. The bottoms from the distillation flask yielded 16.2 grams of a hard, brown colored resin. This resin can be characterized by its solubility in pentane, and in a solution of 25% by weight of potassium hydroxide, 25% by weight of water, and 50% by weight of methanol (commonly known as Claisen's solution), and its insolubility in 10% by weight sodium hydroxide solution.

The resin prepared in the above manner was tested for its antioxidant properties in both gasoline and lard.

*Example I*

Pennsylvania thermally cracked gasoline was utilized as the organic material in this example. The potency of the resin is reported in terms of induction period, which is an accelerated test employed to evaluate the storage stability of gasoline.

The cracked gasoline without the added inhibitor had an induction period of 105 minutes. Upon the addition of 0.1% by weight of the resin produced by the oxidation of 2-tert-butyl-5-methylphenol, the induction period of the gasoline was raised to 495 minutes.

*Example II*

An another example to demonstrate the utility of the resin produced by the oxidation of 2-tert-butyl-5-methylphenol, 0.02% by weight of said resin was added to a sample of lard. The development of rancidity in this lard sample in comparison to a control sample, was followed by the so-called active oxygen method, a standard test for following the development of rancidity of lard, in comparison to a control sample. The control sample became rancid in approximately 4 hours time, and the sample containing the antioxidant resin became rancid in 16½ hours.

I claim as my invention:

1. The resinous oxidation product of a 2,5-dialkylphenol in which the alkyl group in the two position is selected from the group consisting of secondary and tertiary alkyl groups prepared by contacting said 2,5-dialkylphenol at a temperature of from about 0° C. to about 100° C. with an oxidizing agent selected from the group consisting of alkali metal chlorates and ferricyanides, lead dioxide, silver oxide, and hydrogen peroxide.

2. The resinous oxidation product of a 2,5-dialkylphenol in which the alkyl group in the two position is secondary prepared by contacting said 2,5-dialkylphenol at a temperature of from about 0° C. to about 100° C. with an oxidizing agent selected from the group consisting of alkali metal chlorates and ferricyanides, lead dioxide, silver oxide, and hydrogen peroxide.

3. The resinous oxidation product of a 2,5-dialkylphenol in which the alkyl group in the two position is tertiary prepared by contacting said 2,5-dialkylphenol at a temperature of from about 0° C. to about 100° C. with an oxidizing agent selected from the group consisting of alkali metal chlorates and ferricyanides, lead dioxide, silver oxide, and hydrogen peroxide.

4. An organic material subject to oxidative deterioration containing as an antioxidant the resinous oxidation product of claim 1.

5. Gasoline subject to oxidative deterioration containing as an antioxidant the resinous oxidation product of claim 1.

6. A fatty material subject to oxidative deterioration containing as an antioxidant the resinous oxidation product of claim 1.

7. An organic material subject to oxidative deterioration containing as an antioxidant the resinous oxidation product of claim 2.

8. An organic material subject to oxidative deterioration containing as an antioxidant the resinous oxidation product of claim 3.

References Cited in the file of this patent

UNITED STATES PATENTS

| | | |
|---|---|---|
| 2,223,807 | Milas | Dec. 3, 1940 |
| 2,415,800 | Rust et al. | Feb. 11, 1947 |
| 2,438,125 | Lorand et al. | Mar. 23, 1948 |
| 2,490,282 | Seubold et al. | Dec. 6, 1949 |
| 2,515,907 | Stevens et al. | July 18, 1950 |
| 2,540,633 | Rourk | Feb. 6, 1951 |

OTHER REFERENCES

Morvillez et al.: J. Pharm. Chim. 29, 202–9 (1939).